(12) United States Patent
Ma

(10) Patent No.: US 12,258,920 B2
(45) Date of Patent: Mar. 25, 2025

(54) THROTTLE BODY STRUCTURE

(71) Applicant: Guangdong Huakong Auto Tech Co., Ltd, Dongguan (CN)

(72) Inventor: Hongjun Ma, Dongguan (CN)

(73) Assignee: Guangdong HuaKong Auto Tech Co., Ltd., Dongguan (CN)

( * ) Notice: Subject to any disclaimer, the term of this patent is extended or adjusted under 35 U.S.C. 154(b) by 0 days.

(21) Appl. No.: 18/219,734

(22) Filed: Jul. 10, 2023

(65) Prior Publication Data

US 2024/0167428 A1 May 23, 2024

(30) Foreign Application Priority Data

Nov. 22, 2022 (CN) .......................... 202223107543.2

(51) Int. Cl.
*F02D 9/10* (2006.01)

(52) U.S. Cl.
CPC ............. *F02D 9/101* (2013.01); *F02D 9/104* (2013.01); *F02D 9/1095* (2013.01)

(58) Field of Classification Search
CPC ........ F02D 9/101; F02D 9/104; F02D 9/1095; F02D 41/3094; F02M 61/14
See application file for complete search history.

(56) References Cited

U.S. PATENT DOCUMENTS

| | | | | |
|---|---|---|---|---|
| 5,377,646 A | * | 1/1995 | Chasteen | F02M 21/042 48/144 |
| 5,394,846 A | * | 3/1995 | Jaeger | F02M 3/07 123/585 |
| 5,924,398 A | * | 7/1999 | Choi | F02M 35/1211 123/184.53 |
| 7,533,661 B2 | * | 5/2009 | Baasch | F02M 25/00 123/585 |
| 10,961,968 B2 | * | 3/2021 | Farrell | F02M 63/02 |
| 11,674,458 B1 | * | 6/2023 | Ma | F02D 9/1065 123/336 |
| 2008/0029061 A1 | * | 2/2008 | Sugiyama | F02D 9/108 123/337 |
| 2019/0170070 A1 | * | 6/2019 | Shehan | F02M 61/18 |
| 2019/0345883 A1 | * | 11/2019 | Bell | F02D 35/0053 |

* cited by examiner

Primary Examiner — J. Todd Newton

(57) ABSTRACT

An improved throttle body structure is provided. The structure includes a throttle body. The throttle body is provided with a plurality of airflow channels running from top to bottom, each of the airflow channels is internally provided with a butterfly valve for controlling a ventilation volume, and the throttle body is internally provided with injectors whose quantity corresponds to a quantity of the airflow channels. Each of the airflow channels is further internally provided with a tubular atomizer mounted and fixed in a radial direction, the atomizer is in a shape of a blind tube with one opening end, a tube wall of the atomizer is provided with a plurality of atomizing holes, and the opening end of the atomizer is connected to the injectors. The tubular atomizer is used, and the opening end of the atomizer is directly connected to the injectors.

5 Claims, 3 Drawing Sheets

THROTTLE BODY STRUCTURE

CROSS REFERENCE TO THE RELATED APPLICATIONS

This application is based upon and claims priority to Chinese Patent Application No. 202223107543.2, filed on Nov. 22, 2022, the entire contents of which are incorporated herein by reference.

TECHNICAL FIELD

The present disclosure relates to the field of throttle body technologies of a vehicle, and specifically, to an improved throttle body structure.

BACKGROUND

During operation of an engine of a vehicle, air intake and fuel injection need to be controlled through a throttle body, so that air and fuel work through combustion after the air and the fuel are fully mixed. In the field of vehicle modification, players have rich requirements on throttle body modification, which drives merchants to continuously improve and optimize a throttle body structure, to improve product competitiveness. In an existing throttle body product with a plurality of airflow channels (mainly three holes or four holes), although the fuel injection can be better scattered, production and use costs are relatively high, which are specifically reflected in the following aspects: 1. Fuel atomizing is implemented through an atomizing ring embedded and mounted in an inner wall of the airflow channel. To ensure the sealing performance of fuel in the atomizing ring during shunting, a requirement on fitting precision between an outer wall of the atomizing ring and the inner wall of the airflow channel is extremely high. Therefore, requirements on processing and assembly precision of the airflow channel and the atomizing ring are extremely high. As a result, production costs are relatively high, and a larger quantity of airflow channels indicates higher costs. 2. A butterfly valve in each of the plurality of airflow channels requires at least two rotating shafts to drive the butterfly valve to rotate, and to ensure the rotation synchronization of each butterfly valve, a high-precision linkage mechanism needs to be disposed between the two rotating shafts. 3. Although the fuel injection can be scattered through the plurality of airflow channels, an injection volume is also increased. As a result, fuel consumption during use is increased, and the plurality of airflow channels may preempt space of the throttle body, leading to a relatively large size of the throttle body and an increase in product costs.

SUMMARY

The present disclosure provides an improved throttle body structure, to reduce product costs of a throttle body.

To achieve the foregoing objective, the present disclosure adopts the following technical solutions:

An improved throttle body structure is provided, including a throttle body, where the throttle body is provided with a plurality of airflow channels running from top to bottom, each of the airflow channels is internally provided with a butterfly valve for controlling a ventilation volume, and the throttle body is internally provided with injectors whose quantity corresponds to a quantity of the airflow channels; and each of the airflow channels is further internally provided with a tubular atomizer mounted and fixed in a radial direction, the atomizer is in a shape of a blind tube with one opening end, a tube wall of the atomizer is provided with a plurality of atomizing holes, and the opening end of the atomizer is connected to the injectors.

In a preferred solution, the atomizer is located above the butterfly valve, and the atomizer and a rotating shaft of the butterfly valve are disposed perpendicular to each other in the radial direction of the airflow channel.

In a preferred solution, two groups of atomizing holes distributed in a straight line in a length direction thereof are provided on the atomizer, and the two groups of atomizing holes are symmetrically provided on two sides of the atomizer.

In a preferred solution, the throttle body includes a circular top plate connected to a filter and a box body that is integrally formed below the top plate and has an accommodating space, the throttle body is provided with two airflow channels, and both the two airflow channels are located at a right semicircle of the top plate.

In a preferred solution, a bypass channel running through the throttle body is further provided corresponding to a left semicircle of the top plate, and a valve body and a stepping motor that are configured to control opening and closing of the bypass channel are further provided in the box body corresponding to the left semicircle.

In a preferred solution, the box body is disposed rightward to exceed the top plate, and the injectors and fuel lines for supplying fuel to the injectors are provided in the part of the box body exceeding the top plate.

In a preferred solution, the butterfly valves of the two airflow channels share one rotating shaft, one end of the rotating shaft is provided with a spring connecting member causing the butterfly valves to rotate, and the other end of the rotating shaft is provided with an angle sensor configured to detect an opening angle of each of the butterfly valves.

Beneficial effects of the present disclosure are as follows: 1. The tubular atomizer is used, and the opening end of the atomizer is directly connected to the injectors. Therefore, there is no requirement on assembly precision and sealing performance between the atomizer and the airflow channel, thereby greatly reducing a requirement on processing precision of the atomizer and the airflow channel and further reducing product production costs. 2. Two airflow channels are provided. Therefore, processing costs are reduced, and a linkage mechanism between rotating shafts may be omitted compared with a multi-hole throttle body. Besides, a size of the throttle body is further reduced, thereby further reducing product costs. 3. The atomizer and the rotating shaft of the butterfly valve are disposed perpendicular to each other, so that there is a better linear relationship between an opening degree of the butterfly valve and a passed volume of fuel injection. In addition, there are only two airflow channels, fuel consumption can be reduced while combustion efficiency is ensured.

BRIEF DESCRIPTION OF THE DRAWINGS

The present disclosure is further described below in detail with reference to the accompanying drawings and specific embodiments.

DETAILED DESCRIPTION OF THE EMBODIMENTS

The present disclosure is further described below with reference to the accompanying drawings.

Figure 1:
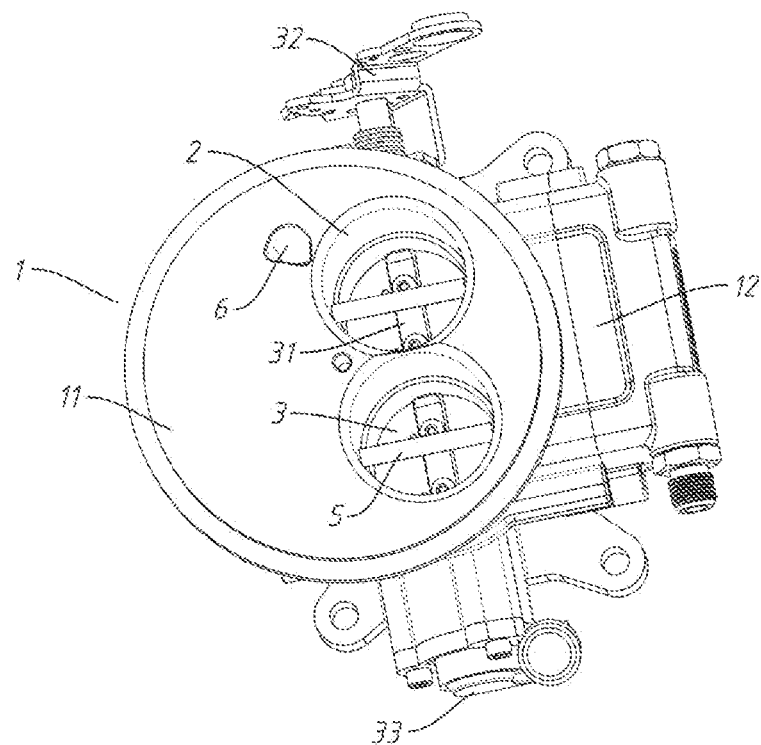
FIG. 1 is a schematic diagram of an overall structure of an air throttle according to an embodiment.
Figure 2:
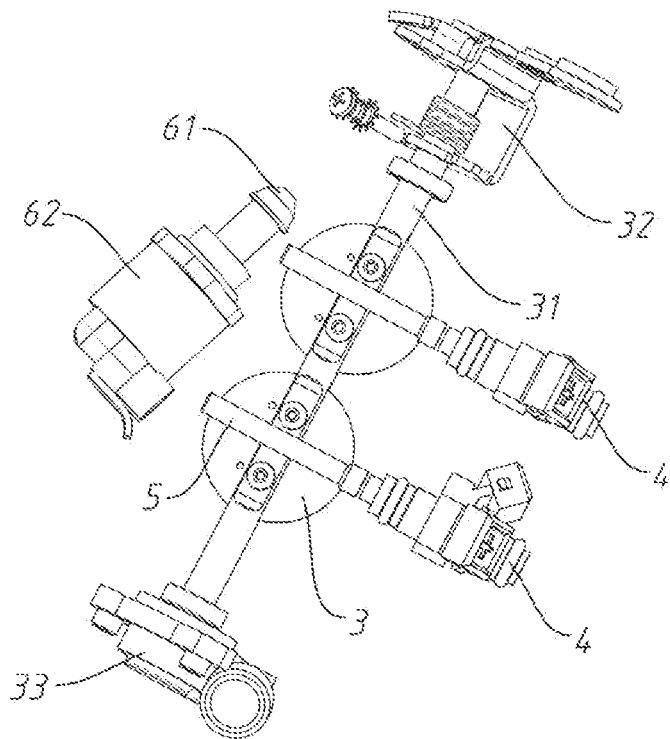
FIG. 2 is a schematic diagram of some mounting structures inside a throttle body according to an embodiment.
Figure 3:
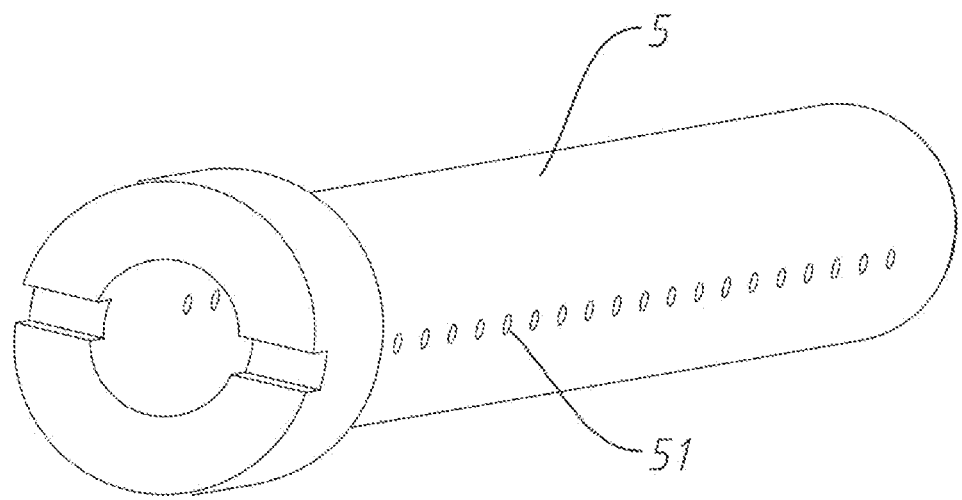
FIG. 3 is a schematic structural diagram of an atomizer according to an embodiment.

Referring to FIG. 1 to FIG. 3, an improved throttle body structure is provided, including a throttle body 1, where the throttle body 1 is provided with a plurality of airflow channels 2 running from top to bottom, each of the airflow channels 2 is internally provided with a butterfly valve 3 for controlling a ventilation volume, and the throttle body 1 is internally provided with injectors 4 whose quantity corresponds to a quantity of the airflow channels 2; and each of the airflow channels 2 is further internally provided with a tubular atomizer 5 mounted and fixed in a radial direction, the atomizer 5 is in a shape of a blind tube with one opening end, a tube wall of the atomizer is provided with a plurality of atomizing holes 51, and the opening end of the atomizer 5 is connected to the injectors 4.

During use, fuel enters the opening end of the atomizer 5 through the injectors 4, and is then sprayed into the airflow channels 2 through the atomizing holes 51. The tubular atomizer 5 is used, and the opening end of the atomizer 5 is directly connected to the injectors 4. Therefore, there is no requirement on assembly precision and sealing performance between the atomizer 5 and the airflow channel 2, thereby greatly reducing a requirement on processing precision of the atomizer 5 and the airflow channel 2 and further reducing product production costs.

In an implementation structure, the atomizer 5 is located above the butterfly valve 3, and the atomizer 5 and a rotating shaft 31 of the butterfly valve 3 are disposed perpendicular to each other in the radial direction of the airflow channel 2. Further, two groups of atomizing holes 51 distributed in a straight line in a length direction thereof are provided on the atomizer 5, and the two groups of atomizing holes 51 are symmetrically provided on two sides of the atomizer 5. Under the action of pressure, the fuel sprayed out from the atomizing holes 51 necessarily generate a specific spray distance, if the atomizer 5 and the rotating shaft 31 of the butterfly valve 3 are disposed parallel to each other, more fuel injection is always gathered at openings on two sides of the butterfly valve 3 regardless of an opening angle of the butterfly valve 3. As a result, a linear relationship between a volume of fuel injection entering an engine and the opening angle of the butterfly valve 3 is relatively poor. When the atomizer 5 and the rotating shaft 31 of the butterfly valve 3 are disposed perpendicular to each other, the linear relationship between the opening angle of the butterfly valve 3 and the volume of fuel injection entering the engine is better, so that an output of the engine is more linear. In other embodiments, more groups of atomizing holes 51 may be provided.

Figure 4:
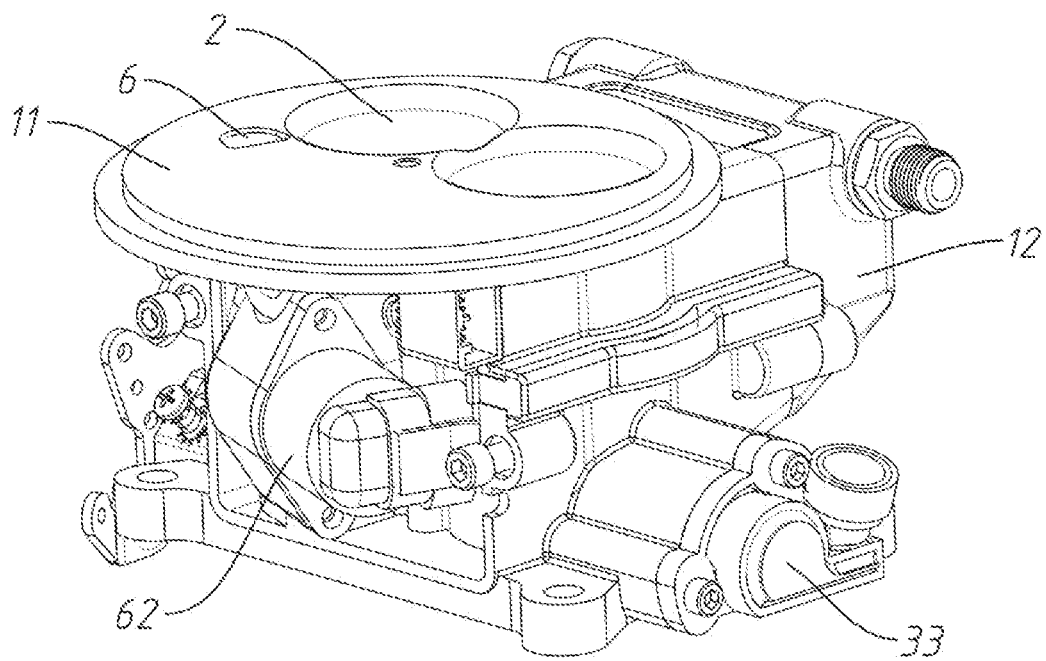
FIG. 4 is a schematic diagram of an internal structure on a left side of a throttle body according to an embodiment.
Figure 5:
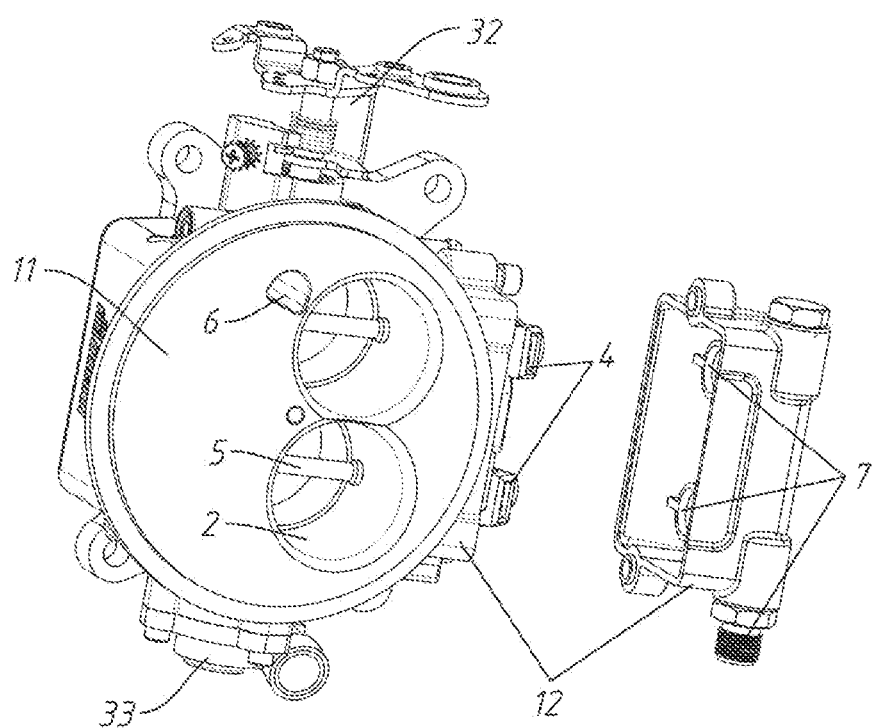
FIG. 5 is a schematic exploded structural view of a right side of a throttle body according to an embodiment.

Referring to FIG. 1, FIG. 4, and FIG. 5, in an implementation structure, the throttle body 1 includes a circular top plate 11 connected to a filter and a box body 12 that is integrally formed below the top plate 11 and has an accommodating space, the throttle body 1 is provided with two airflow channels 2, and both the two airflow channels 2 are located at a right semicircle of the top plate 11. In this structure, only two airflow channels 2 are provided. Compared with a throttle body with a single airflow channel 2, fuel injection may be mixed with air more uniformly and then enter the engine, so that combustion efficiency is improved; and compared with a throttle body with a plurality of airflow channels 2, this structure can reduce fuel consumption and reduce processing costs.

Referring to FIG. 4 and FIG. 5, in an implementation structure, a bypass channel 6 running through the throttle body 1 is further provided corresponding to a left semicircle of the top plate 11, and a valve body 61 and a stepping motor 62 that are configured to control opening and closing of the bypass channel 6 are further provided in the box body 12 corresponding to the left semicircle. Further, the box body 12 is disposed rightward to exceed the top plate 11, and the injectors 4 and fuel lines 7 for supplying fuel to the injectors 4 are provided in the part of the box body 12 exceeding the top plate. Because there are only two airflow channels 2, the bypass channel 6, the valve body 61, and the stepping motor 62 may be mounted in the box body 12 below the left semicircle of the top plate 11. Therefore, a size of the throttle body 1 is reduced. In addition, the throttle body 1 is made by a metal material through processing, so that the reduced size can significantly reduce product material costs.

Referring to FIG. 2, in an implementation structure, the butterfly valves 3 of the two airflow channels 2 share one rotating shaft 31, one end of the rotating shaft 31 is provided with a spring connecting member 32 causing the butterfly valves 3 to rotate, and the other end of the rotating shaft is provided with an angle sensor 33 configured to detect an opening angle of each of the butterfly valves 3. When two butterfly valves share one rotating shaft 31, compared with a multi-hole throttle body, a linkage between rotating shafts 31 is omitted, so that product costs are further reduced, and absolute synchronization of the butterfly valves 3 in the two airflow channels 2 may be ensured simultaneously.

The above description constitutes no limitation to the technical scope of the present disclosure, and any change, equivalent variation, or modification made to the foregoing embodiments according to the technical essence of the present disclosure still falls within the scope of the technical solutions of the present disclosure.

What is claimed is:

1. An improved throttle body structure, comprising a throttle body, wherein the throttle body is provided with a plurality of airflow channels running from top to bottom, each of the plurality of airflow channels is internally provided with a butterfly valve for controlling a ventilation volume, and the throttle body is internally provided with injectors, wherein a quantity of the injectors corresponds to a quantity of the plurality of airflow channels;

each of the plurality of airflow channels is further internally provided with a tubular atomizer, two ends of the tubular atomizer are mounted and fixed in a radial direction of each of the plurality of airflow channels, the tubular atomizer is in a shape of a blind tube with one opening end, a tube wall of each tubular atomizer is provided with two groups of atomizing holes, and the opening end of the tubular atomizer is connected to the injectors;

the tubular atomizer is located above the butterfly valve, and the tubular atomizer and a rotating shaft of the butterfly valve are disposed perpendicular to each other in the radial direction of each of the plurality of airflow channels; and the two groups of atomizing holes distributed in a straight line in a length direction of the tubular atomizer, and the two groups of atomizing holes are symmetrically provided on two sides of the tubular atomizer.

2. The improved throttle body structure according to claim 1, wherein the throttle body comprises a circular top plate and a box body, wherein the circular top plate is connected to a filter, and the box body is integrally formed below the circular top plate and has an accommodating space, the throttle body is provided with two airflow channels, and the two airflow channels are located at a right semicircle of the circular top plate.

3. The improved throttle body structure according to claim 2, wherein a bypass channel running through the throttle body is further provided corresponding to a left semicircle of the circular top plate, and a valve body and a stepping motor are further provided in the box body corresponding to the left semicircle, wherein the valve body and the stepping motor are configured to control opening and closing of the bypass channel.

4. The improved throttle body structure according to claim 3, wherein the box body is disposed rightward to exceed the circular top plate, and the injectors and fuel lines for supplying fuel to the injectors are provided in a part of the box body exceeding the circular top plate.

5. The improved throttle body structure according to claim 2, wherein the butterfly valves of the two airflow channels share one rotating shaft, a first end of the rotating shaft is provided with a spring connecting member causing the butterfly valves to rotate, and a second end of the rotating shaft is provided with an angle sensor configured to detect an opening angle of each of the butterfly valves.

* * * * *